United States Patent [19]

Kovalick

[11] Patent Number: 5,187,677
[45] Date of Patent: Feb. 16, 1993

[54] WAVEFORM SYNTHESIZER THROUGH SIMULATING MULTIPLICATION

[75] Inventor: Albert W. Kovalick, Santa Clara, Calif.

[73] Assignee: Hewlett-Packard Company, Palo Alto, Calif.

[21] Appl. No.: 749,384

[22] Filed: Aug. 23, 1991

[51] Int. Cl.$^5$ .............................................. G06F 1/02
[52] U.S. Cl. .................................................... 364/721
[58] Field of Search ........................ 364/721, 718, 754

[56] References Cited

U.S. PATENT DOCUMENTS

| | | | |
|---|---|---|---|
| 3,633,017 | 1/1972 | Crooke | 364/721 |
| 4,644,839 | 2/1987 | Nishimoto | 364/721 |
| 4,888,719 | 12/1989 | Yassa | 364/721 |
| 4,891,778 | 1/1990 | Baseghi et al. | 364/721 |
| 4,905,177 | 2/1990 | Weaver et al. | 364/721 |
| 4,937,773 | 6/1990 | Mittermaier et al. | 364/721 |
| 5,031,131 | 7/1991 | Mikos | 364/721 |

Primary Examiner—David H. Malzahn
Attorney, Agent, or Firm—Peter P. Tong

[57] ABSTRACT

A novel waveform synthesizer that generates a select output waveform, through simulating the multiplication of the components of the output waveform, is disclosed. One embodiment of this synthesizer is based on the following equation:

$$\mathrm{Sin}(\mathrm{Sin}^{-1}V+\mathrm{Cos}^{-1}U)+\mathrm{Sin}(\mathrm{Sin}^{-1}V-\mathrm{Cos}^{-1}U)=-2*U*V.$$

The components U, V of the select output waveform are generated in parallel by at least three different ways. They can be fed in externally or they can be read from pre-stored waveforms in Read-Only-Memories or they can be the outputs of phase accumulators. The components or their trigonometrically transformed versions are then added together or subtracted from each other to generate intermediate waveforms. These intermediate waveforms or their trigonometrically transformed versions are then added together to generate the selected output waveform. Therefore the product of any two waveforms can be generated without the need of multiplying them together. Thus the invention eliminates the need of multipliers in waveform synthesizers. With latches at the outputs of every components in the system, the speed of the system is no longer limited by the speed of multipliers, as in most of the prior arts; instead, it is limited only by the speed of the clock waveform or the speed of the slowest operation, whichever is slower.

12 Claims, 13 Drawing Sheets

WAVEFORM SYNTHESIZER THROUGH SIMULATING MULTIPLICATION

BACKGROUND OF THE INVENTION

In the art of synthesizing signals, three distinguishable techniques have been used: direct synthesis, indirect synthesis, and numerical synthesis.

In the technique of direct synthesis, the desired signal is produced directly from an oscillator. In synthesizing a wide frequency range, this technique becomes extremely complex and costly. Hence this technique is not widely used for wide frequency ranges.

In indirect synthesis, phase lock loops with programmable frequency dividers are commonly used to synthesize the desired frequencies. This technique is by far the most widely used at present both in commercial products and in dedicated applications. The method owes its popularity in large part to the advent of inexpensive programmable frequency dividers in integrated circuit form. The result has been a substantial reduction in complexity, especially in comparison with direct synthesis.

However, neither the direct synthesis nor the indirect synthesis technique in the prior art allows for phase-continuous switching of the carrier signal when the desired synthesizer signal is modulated. Furthermore, both techniques require extensive analog components which are subject to drift and malfunction through aging, temperature effects, and the like.

Numerical synthesis with digital techniques is useful for avoiding the above problems. FIG. 1 depicts a block diagram of a typical digital numerical synthesizer known in the prior art. Basically, numerical synthesis consists of generating a stream of points representing a desired signal by using digital logic circuits in a digital waveform engine 100. This numerical data stream is converted into the actual desired signal by means of a K-bit digital-to-analog converter (DAC) 200. The DAC output is passed through a low-pass filter (LPF) 300 to remove the frequency components from the sampling clock and then amplified by an amplifier 400. An example of such a system for synthesizing signals in the prior art is described in U.S. Pat. No. 3,928,813.

FIG. 2 and FIG. 3 show two general methods to implement the digital waveform engine block of a typical digital synthesizer.

The first general method, as depicted in FIG. 2, is an accumulator-based synthesizer. This method generates a carrier frequency with frequency modulation (FM) through accumulating instantaneous phase increments. The carrier frequency is combined with user-defined amplitude modulation (AM) and phase modulation (PM) signals. Memory address sequencers 20 and 200 serve as address sources for modulation waveform in Random Access Memories (RAM) 30 and 300. The address increments from a start-to-stop address while looking up stored modulation data that spans the address space. Both AM and PM waveform data are completely user-defined and loaded into the modulation RAMs as needed. A multiplexer (MUX) 40 selects either the digital signal from the PM waveform RAM 30 or an external input 2 to supply the phase for phase modulation. Similarly, a parallel MUX 400 culls either the digital signal from an AM waveform RAM 300 or an external input 1 to supply the amplitude for amplitude modulation.

The key component in this type of synthesizer is a clocked phase accumulator 90. Its purpose is to accumulate an instantaneous phase increment or IPI(t). IPI(t) is defined by the equation, $$IPI(t) = F_i(t) * \Delta t * 2\pi$$

where $F_i(t)$ is the instantaneous frequency of the desired signal and $\Delta t$ is the clock signal. The instantaneous frequency represents the continuous frequency and any FM(t) as desired.

A phase adder 50 then combines the phase for phase modulation from MUX 400 with the output of the phase accumulator to provide the total phase of the desired signal. A sine lookup table 70 then transforms the linear phase to a sinusoidal signal, which is multiplied with the amplitude modulation signal by a multiplier 80 giving:

$$Y(t) = AM(t) * \sin(\Sigma IPI(t) + PM(t)). \quad (1)$$

Y(t) is a digital signal comprising a carrier with frequency modulation, amplitude modulation and phase modulation. The digitally sampled data are fed to the DAC and LPF of FIG. 1 to form the desired analog signal. This method provides a useful output bandwidth that is about 40% of the sample clock frequency.

In the above-described accumulator-based synthesizer method, a physical multiplier is needed to create the waveform. For clock rates exceeding 50 MHz, this multiplier becomes difficult to implement. It is also the weak link in the synthesis chain and is often the limiting factor in raising the sample clock rate. As will be seen, it is the purpose of the present invention to eliminate the multiplier and yet achieve amplitude modulation and signal multiplication.

FIG. 3 illustrates the second general method to implement the digital waveform engine block. This method may be classified as an arbitrary waveform synthesis technique. In concept, a user-defined sampled data waveform is stored in a waveform RAM 30, which contains an exact image of the desired output waveform. This RAM is addressed by a sequencer 20, and the data stream from the RAM 30 are fed to a DAC. The useful output bandwidth of this configuration is about 40% of the sample clock frequency.

This method does not need a phase accumulator, a sine lookup table or a multiplier as in the accumulator-based method and is highly suitable for generating waveforms often classified as "arbitrary." However, one advantage of the accumulator-based synthesizer is that it is more suitable to generate a signal with well-defined amplitude and phase modulation waveforms because it is structured with separate inputs for each of the modulation signals. Therefore, the user only has to supply the modulation signals to each of the inputs. On the other hand, for an arbitrary waveform synthesizer, the user has to generate the addresses for the memory address sequencer which controls the outputs of the waveform RAM. The outputs of the waveform RAM are the digital equivalence of the desired signal. All these steps take time and effort, and the result is not as clean and obvious as putting modulation signals into inputs of an accumulator-based synthesizer. Another advantage of an accumulator-based synthesizer is its phase accumulator, which can easily give an instantaneous frequency resolution (typically << 1 Hz) much smaller than that achievable by an arbitrary waveform synthesizer.

The circuit shown in FIG. 4 is an enhancement of the one in FIG. 3. In this improved architecture, a first and a second waveform RAMs, 30 and 300, are combined to form the final signal. From an application standpoint, to compose the desired signal as either the sum or product of two signals is often desirable. U(t) denotes the signal on the output of a first MUX 40 and V(t) denotes the signal on the output of a second MUX 400. If the desired signal is the sum of U(t) and V(t), then a fourth MUX 60 will select U(t)+V(t) to be its output and a third MUX 150 will select unity to be its output. A multiplier 500 will then multiply the signal (U(t)+V(t)) by the unity signal to generate the desired signal, U(t)+V(t). On the other hand, if the desired signal is the product of U(t) and V(t), then the fourth MUX 60 will select U(t) to be its output and the third MUX 150 will select V(t) to be its output. The multiplier 500 will again multiply its input signals together to generate the desired signal U(t)*V(t). As in the method defined by the circuit in FIG. 2, the multiplier is the weak link in the synthesis chain. For clock rates exceeding about 50 Mhz, the multiplier becomes difficult to implement and bandwidth limiting.

The novel technique in accordance with the present invention incorporates adders, subtractors and trigonometric manipulators in place of multipliers in a digital synthesizer. Thus, the invention has removed the bandwidth-limiting and difficult-to-implement component, the multiplier.

The use of addition and subtraction to achieve the effect of trigonometric multiplication in digital music synthesis was reported by Mr. S. Saunders in the article entitled "Real-time FM Digital Music Synthesis," Proceedings Music Computation Conf., Urbana, IL (November 1975) and by H. G. Alles in the article entitled "Music Synthesis Using Real Time Digital Techniques," Proceedings of the IEEE, Vol. 68, No. 4 (April 1980). The basic idea is shown in the following equation:

$$\text{Sin } (x+d) + \text{Sin } (x-d) = 2 \text{ Cos } d \text{ Sin } x$$

Alles and Saunders apply the idea of a trigonometric identity to spectral modulation and control of the loudness of digital music in the area of acoustics. The present invention, in contrast, applies the idea of a trigonometric identity to generating arbitrary waveforms. The two parallel ideas have significant differences. For example, Saunders fetches serially the two sinusoidal signals for addition in the above equation, whereas the present invention fetches both signals in parallel. Alles and Saunders describe the combination of sinusoidally varying signals for synthesizing digital music, whereas the present invention teaches combining random waveforms. Other differences will be shown by the following description of the present invention.

SUMMARY OF THE INVENTION

The preferred embodiment of the invention simulates multipliers in a digital waveform synthesizer with adders, subtractors and trigonometric manipulators. One embodiment of this invention employs the idea of a trigonometric identity which states that the multiplication of two sinusoidal waveforms is equivalent to trigonometrically transforming the waveforms and then selectively adding and subtracting and trigonometrically transforming them. Thus this design achieves amplitude modulation and waveform multiplication without a multiplier. An externally applied waveform, a phase accumulator waveform and streams of digital data pre-stored in RAMs serve as the inputs for the separate components of the desired waveform. In the preferred embodiment, the synthesizer has more than one input. One advantage of such a multi-input configuration is that it simplifies implementing phase and amplitude modulation on a carrier waveform.

BRIEF DESCRIPTION OF THE DRAWINGS

FIG. 7a is the output of the phase accumulator 100 or the input-adder 210. It is the phase of the carrier frequency in modulo 2 π format. FIG. 7b is the waveform U(t) in the first waveform RAM 20. FIG. 7c is the output of the first component-selection MUX 50. FIG. 7d is the output of the first adder/substractor 60, again in modulo 2 π format. FIG. 7e is the output of the first output-selection MUX 80. FIG. 7f is the output of the second adder/subtractor 160. FIG. 7g is the output of the second output-selection MUX 180. Finally, FIG. 7h is the output of the output-adder 90, the desired amplitude modulated waveform.

FIG. 8a is the exponentially decaying function, the output of the second input-selection MUX 130. FIG. 8b is the sinusoidal function, the output of the first input-selection MUX 30. FIG. 8c is the output of the first component-selection MUX 50. FIG. 8d is the output of the second component-selection MUX 150. FIGS. 8e and 8f are the outputs of the first and second output-selection MUXs 80 and 180 respectively. Finally FIG. 8g is the output of the output-adder 90, the desired output waveform, a sinusoidal waveform that is exponentially decaying.

DETAILED DESCRIPTION OF THE INVENTION

Figure 1:
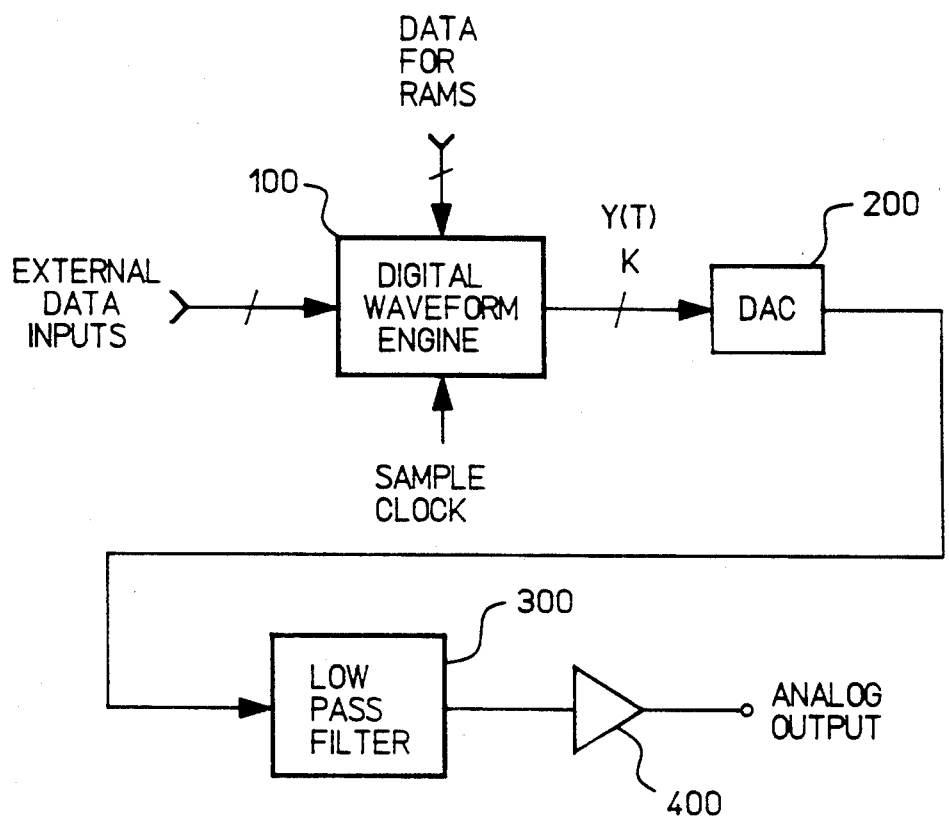
FIG. 1 shows a generic block diagram of a prior art digital synthesizer.
Figure 3:
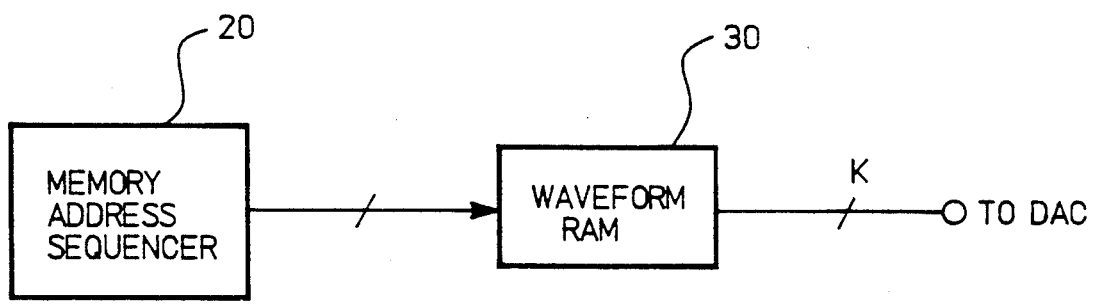
FIG. 3 discloses an arbitrary-waveform-based digital synthesizer in the prior art.
Figure 2:
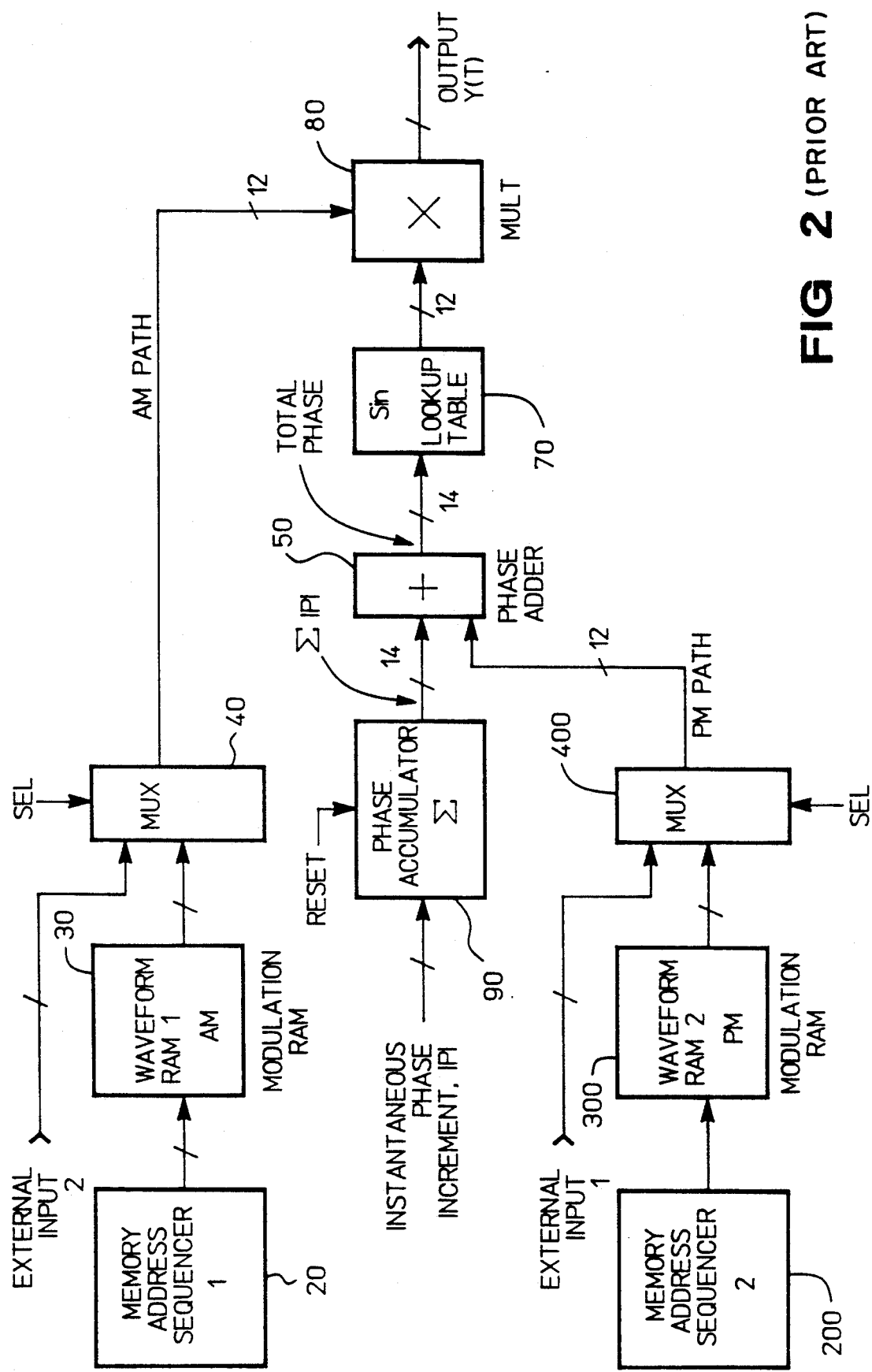
FIG. 2 illustrates a prior art accumulator-based digital synthesizer with amplitude and phase modulation.
Figure 4:
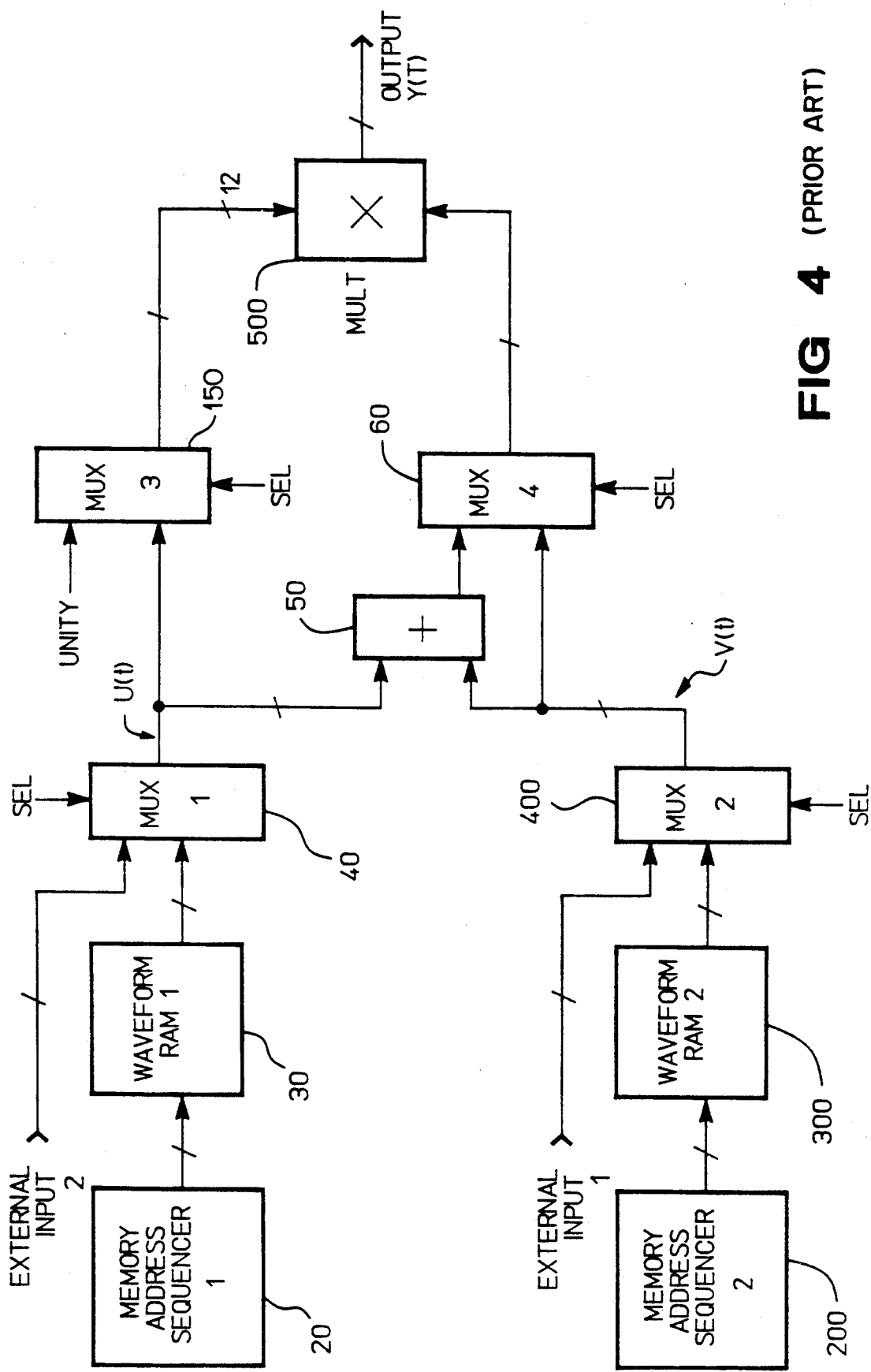
FIG. 4 demonstrates a digital synthesizer that can perform addition and multiplication of two typical arbitrary waveform synthesizers in the prior art.
Figure 5:
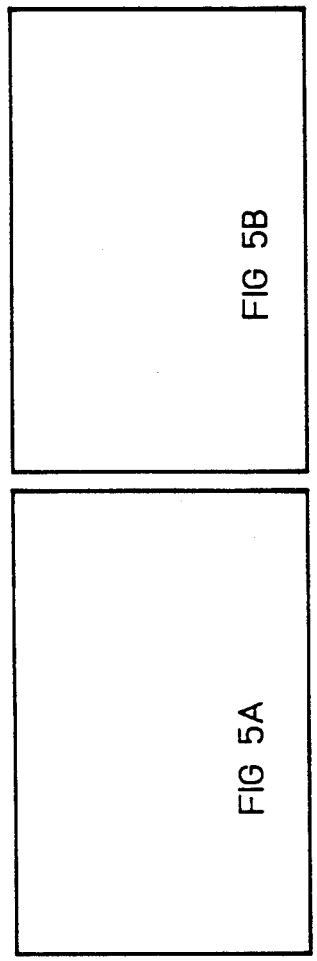
FIGS. 5A and 5B depict a preferred embodiment of the invention, a digital synthesizer with adders, subtractors and trigonometric manipulators in place of multipliers.
Figure 5A:
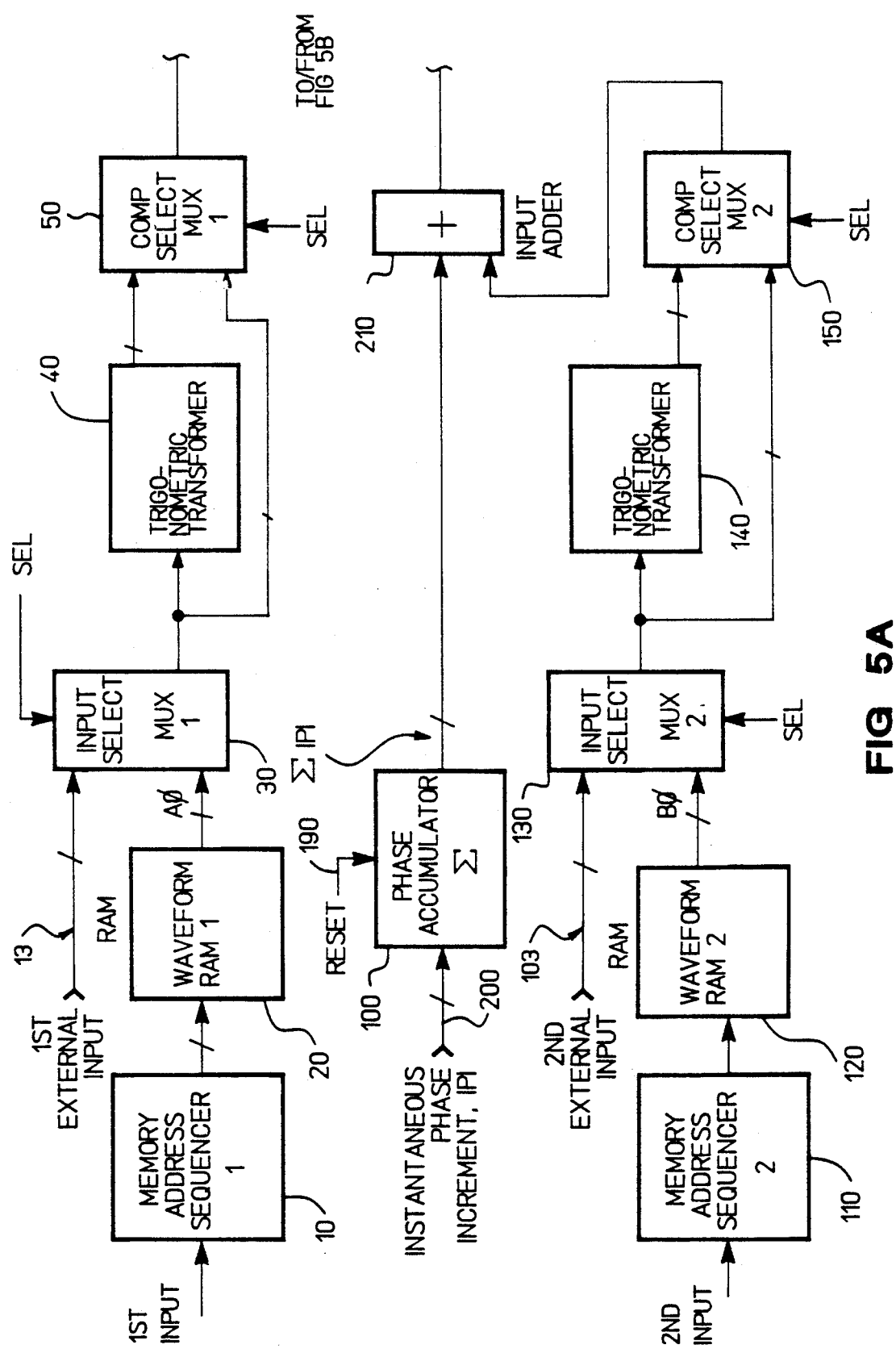
Figure 5B:
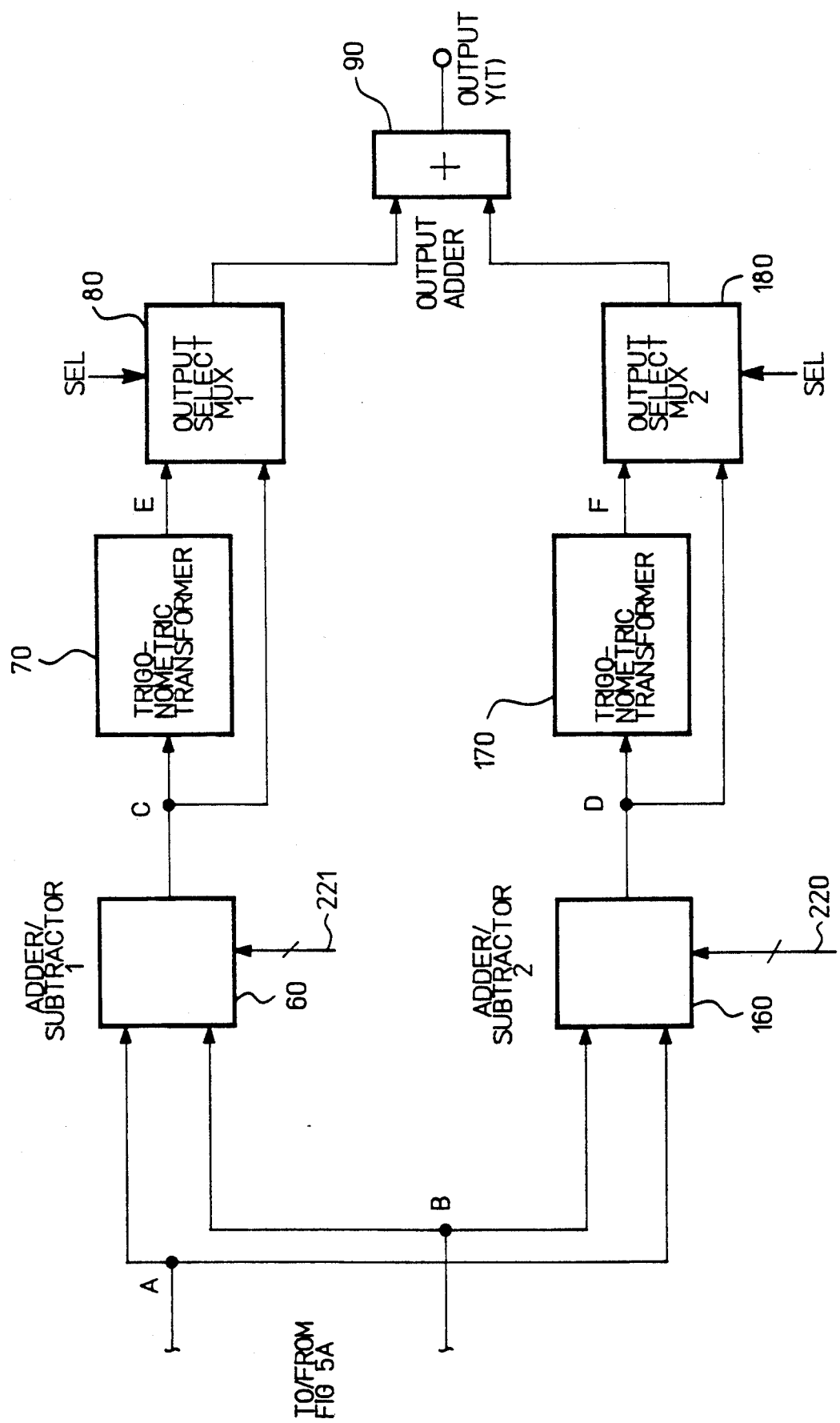
Figure 6A:
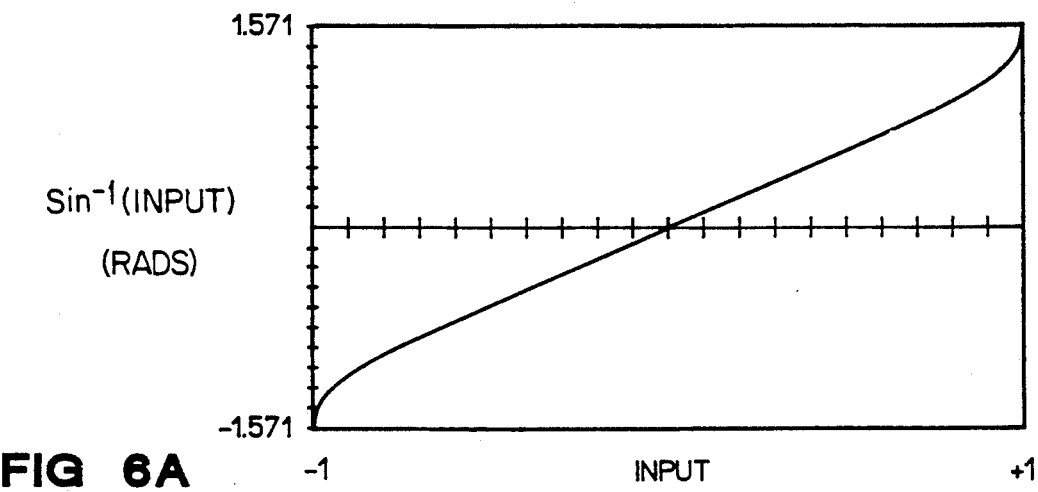
FIGS. 6a, 6b and 6c illustrate transfer functions of typical trigonometric transformers with inputs on the x-axes and outputs on the y-axes.
Figure 6B:
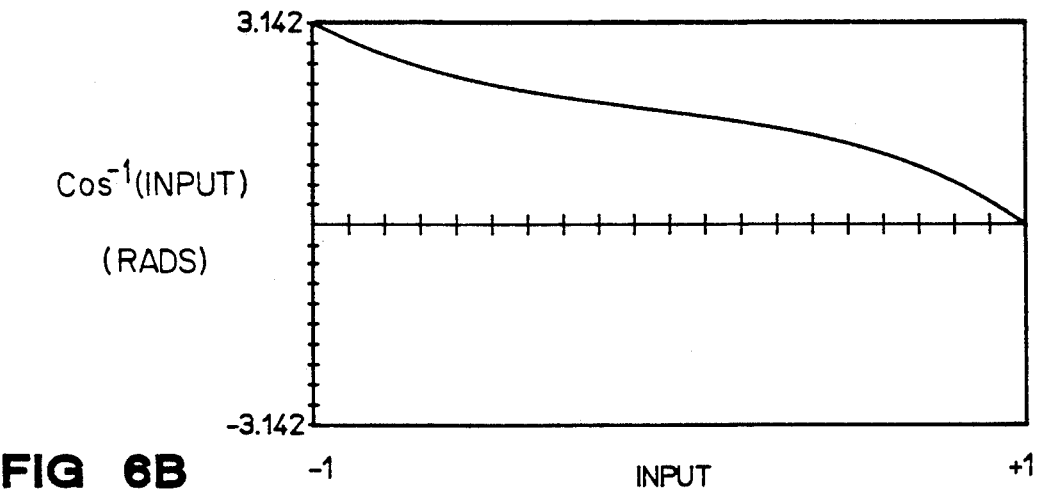
Figure 6C:
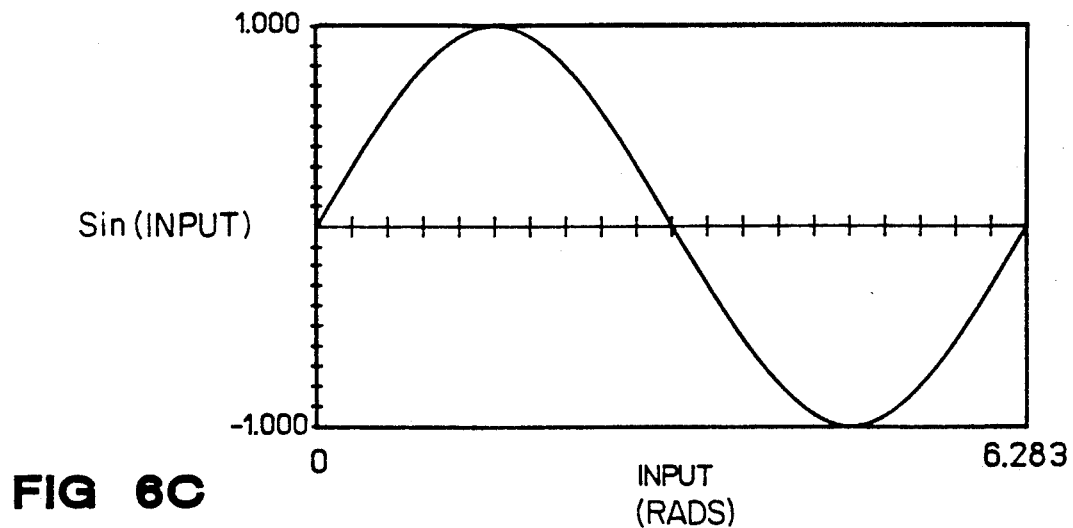
Figure 7A:
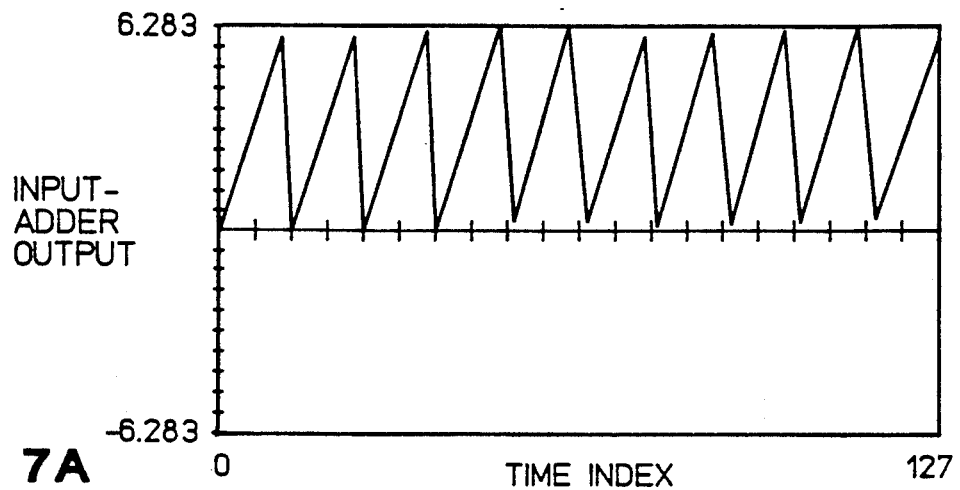
FIGS. 7a to 7h illustrate output waveforms in applying the invention to generate an amplitude modulated waveform U(t)* sin (ωt).
Figure 7B:
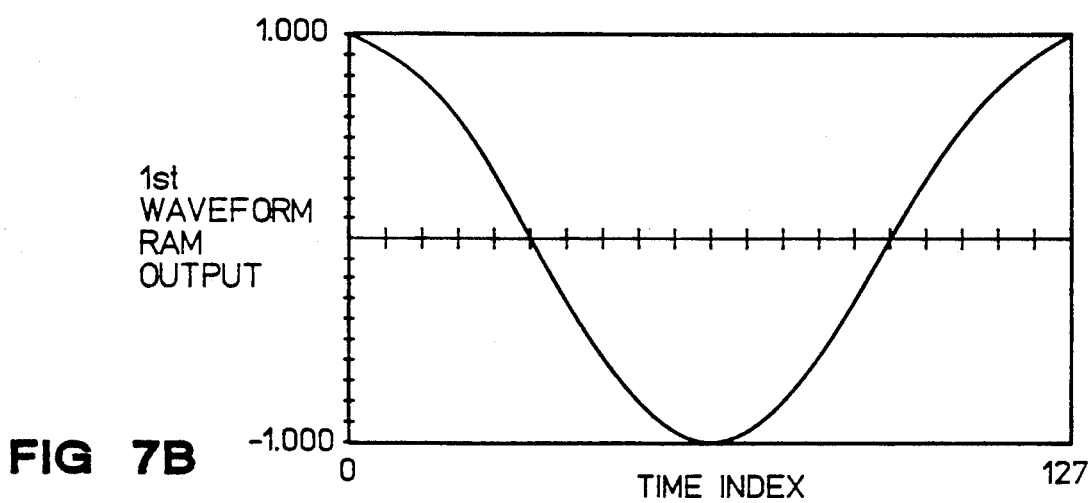
Figure 7C:
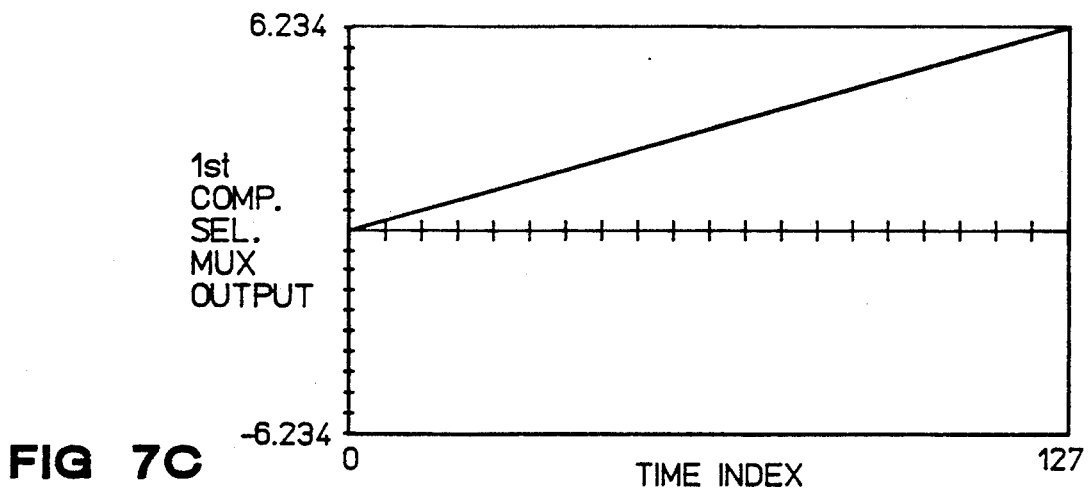
Figure 7D:
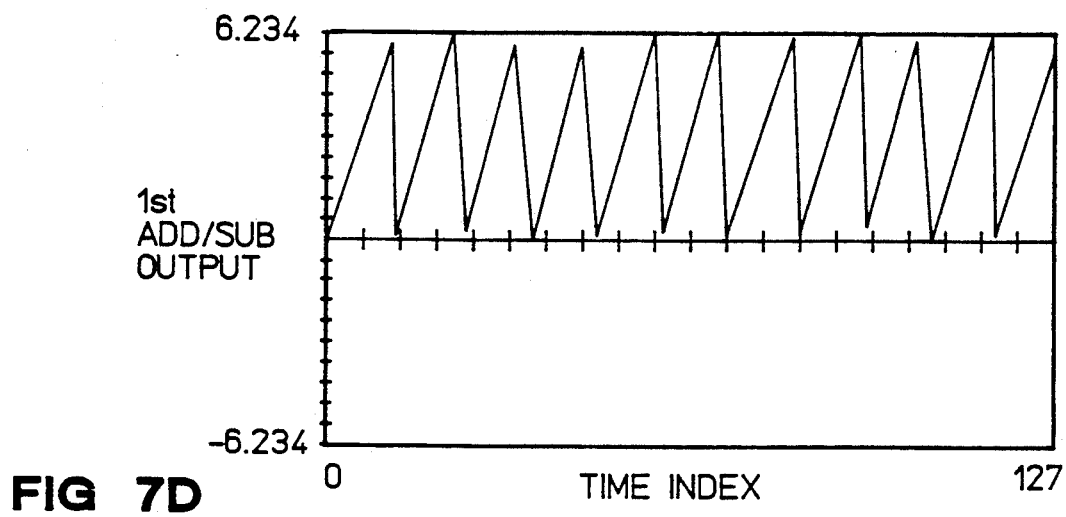
Figure 7E:
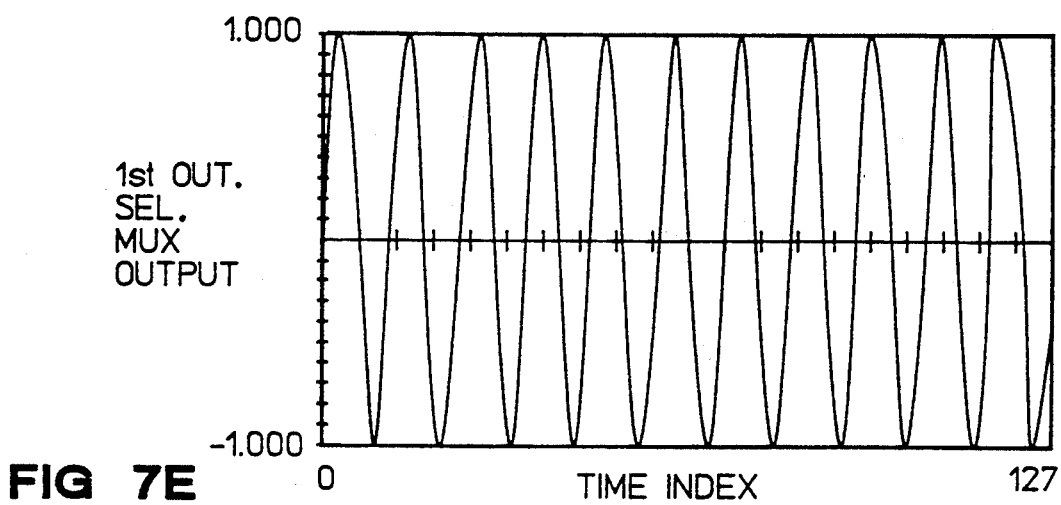
Figure 7F:
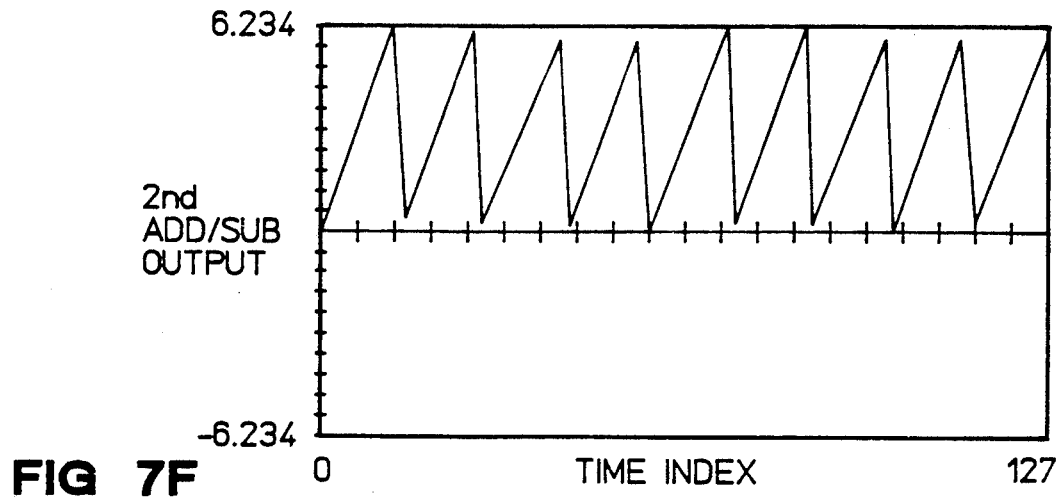
Figure 7G:
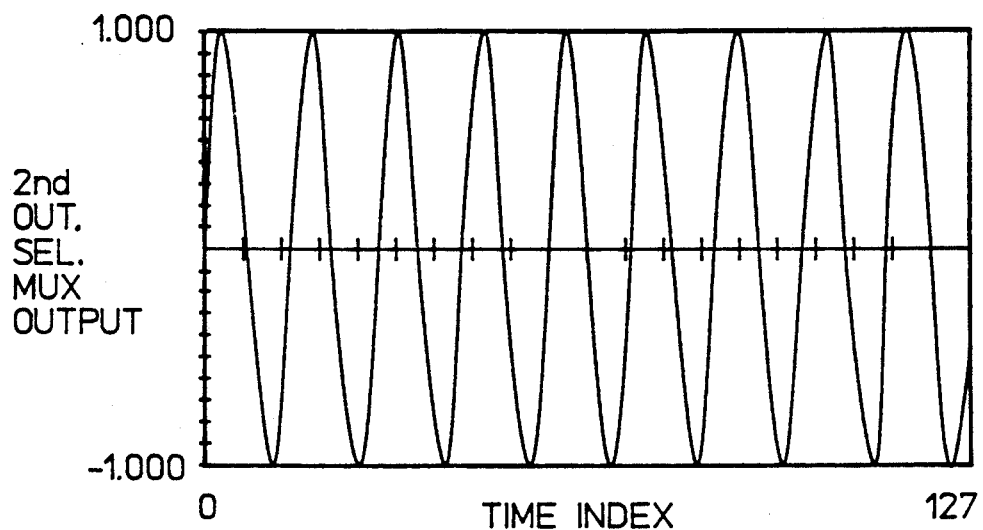
Figure 7H:
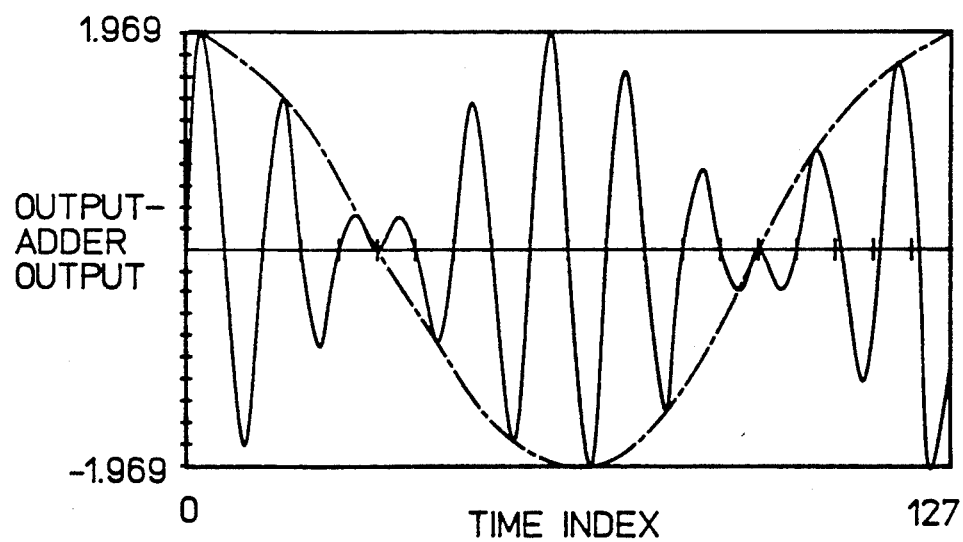
Figure 8A:
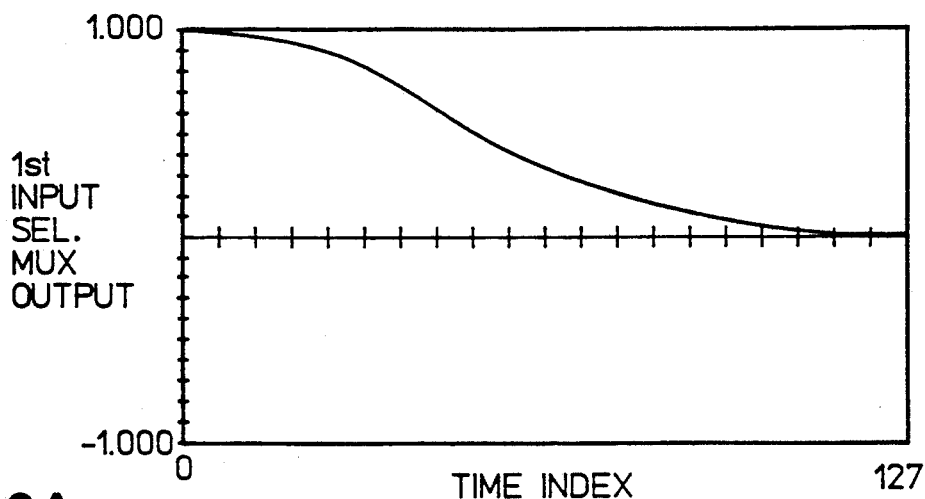
FIGS. 8a to 8g depict output waveforms in applying the present invention to effect a multiplication of an exponentially decaying waveform with a sinusoidal waveform.
Figure 8B:
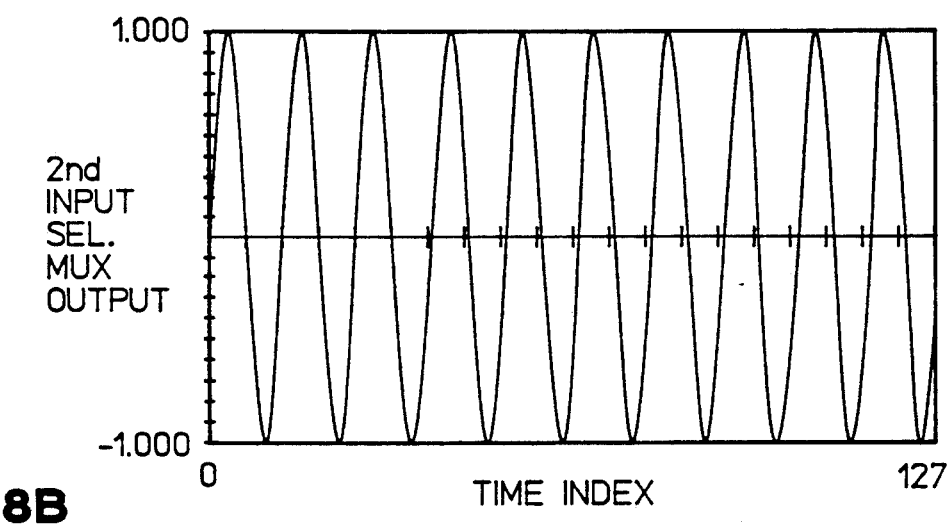
Figure 8C:
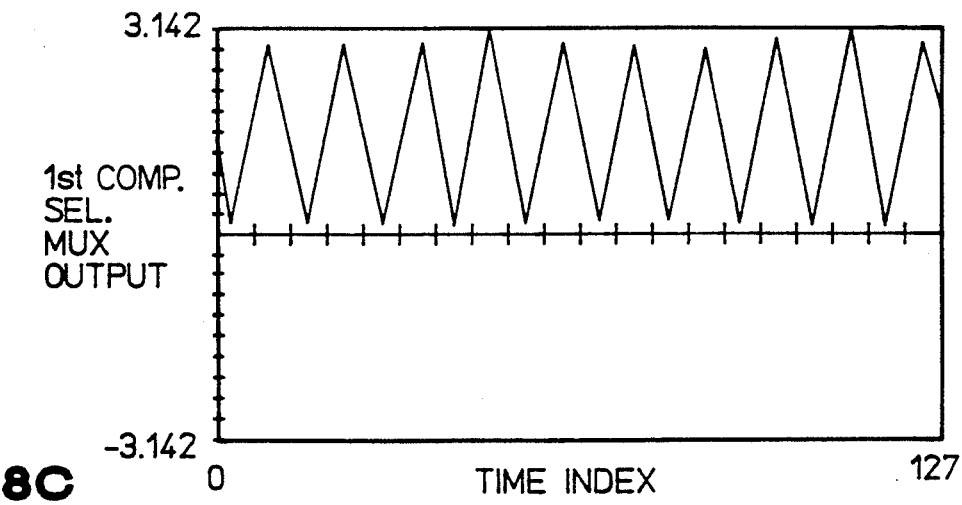
Figure 8D:
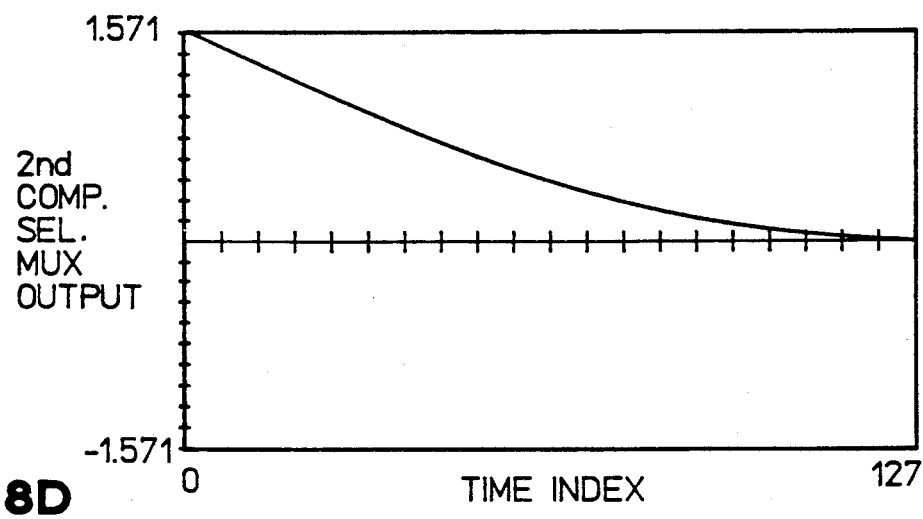
Figure 8E:
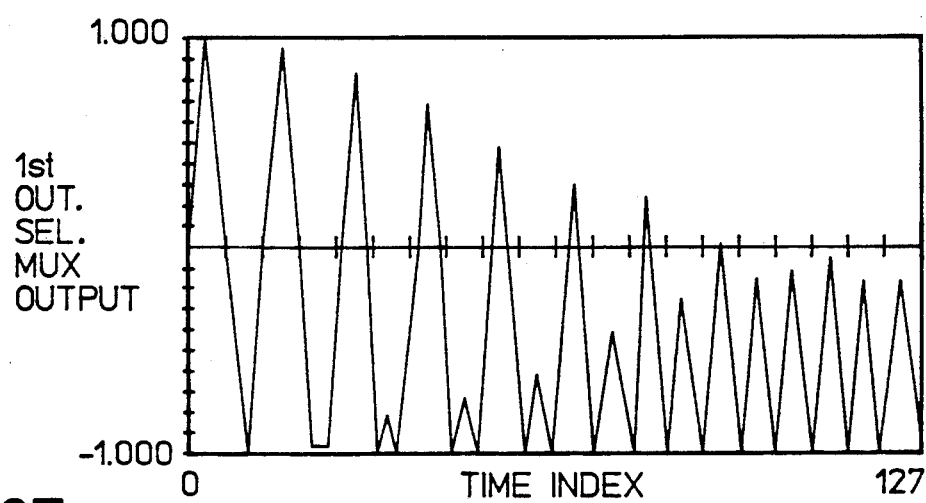
Figure 8F:
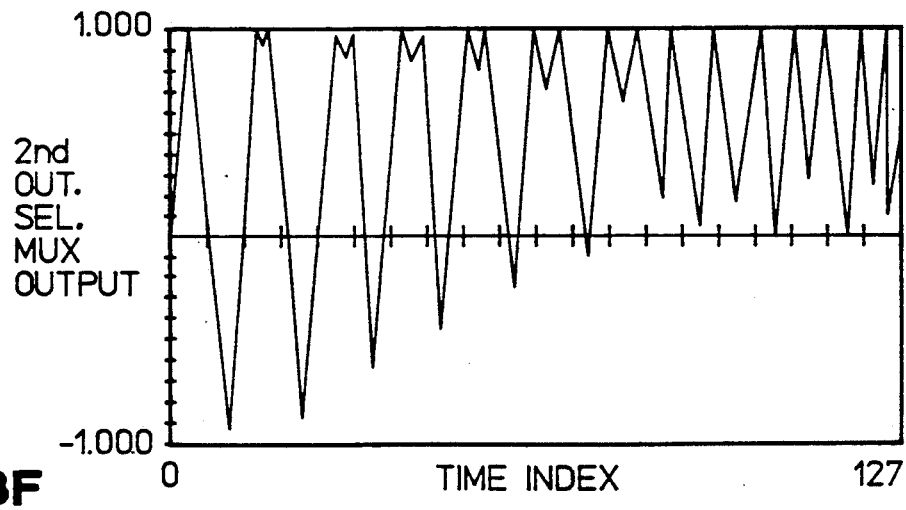
Figure 8G:
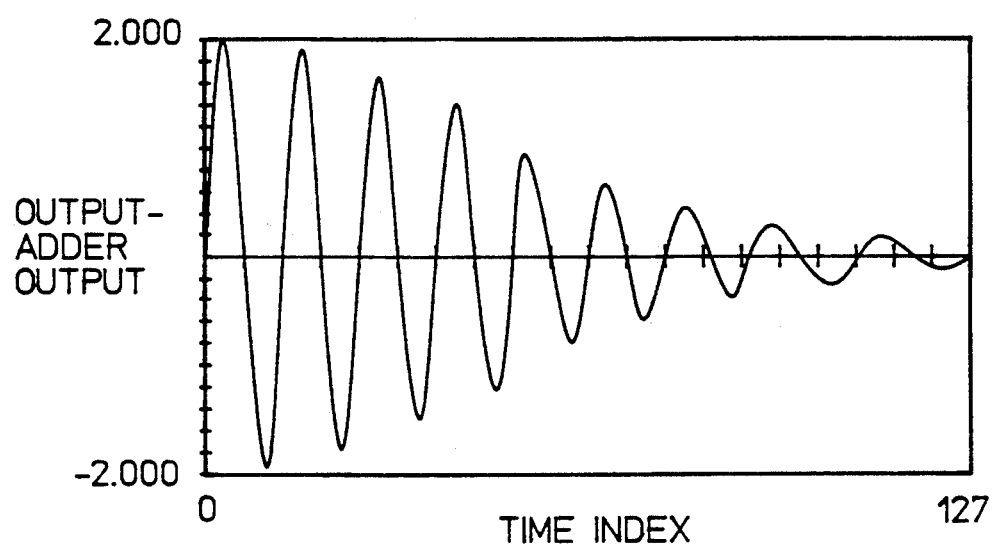

FIG. 5 illustrates a preferred embodiment of the present invention. The first and second memory-address-sequencers 10, 110 are address sources for a first and second waveform RAMs 20, 120, respectively. Each of the two sequencers 10, 110 increments addresses from a start address to a stop address as triggered by its corresponding input waveform. The addresses control the outputs of the waveform RAMs 20, 120. Data in the RAMs 20, 120 are completely user-defined and are loaded into the waveform RAMs 20, 120 as preselected. The pre-stored data can be the first and second components of the desired output waveform. A first input-selection MUX 30 picks either the pre-stored data from the first waveform RAM 20 or from a first external input 13; while a second input-selection MUX 130 selects either the pre-stored data from the second waveform RAM 120 or from a second external input 103. Depending on its setting, the output of a first component-selection MUX 50 is either the waveform coming out of the first input-selection MUX 30 or a trigonometrically transformed waveform of the waveform from the first input-selection MUX 30. Similarly, the output of a second component-selection MUX 150 is either the waveform coming out of the second input-selection MUX 130 or the trigonometrically transformed waveform of the waveform from the second input-selection MUX 130. FIGS. 6a, 6b and 6c illustrate transfer functions of typical trigonometric transformers with inputs on the x-axes and outputs on the y-axes. FIG. 6a depicts a transformer for arc sine, FIG. 6b for arc cosine and FIG. 6c for sine.

One embodiment of the present invention comprises three inputs. The first two, as described above, are now the outputs of the first and second component-selection MUXs 50, 150. The third input waveform is an instantaneous phase increment IPI. It represents the phase of a continuous sinusoidal wave with optional FM riding on it. The output ΣIPI of a phase accumulator 100 is either the summation of IPI at each clock instant or zero, depending upon the waveform put on a reset 190 to the phase accumulator 100. The output ΣIPI is summed with the output of the second component-selection MUX 150 by an input-adder 210. Then a first adder/subtractor 60 adds the output B of the input-adder 210 to the output A of the first component-selection MUX 50, while a second adder/subtractor 160 either forms the sum or the difference of the outputs A, B of the input-adder 210 and the first component-selection MUX 50, depending on the control waveform 220 applied to the second adder/subtractor 160. A first output-selection MUX 80 picks either the output of the first adder/subtractor 60 or its trigonometrically transformed value E, and a second output-selection MUX 180 extracts either the output of the second adder/subtractor 160 or its trigonometric transformed value F. Finally, an output-adder 90 adds together the outputs of the first and the second output-selection MUXs 80, 180 to generate the desired output waveform.

This invention substitutes physical multiplication of any two random waveforms in a digital synthesizer with addition, subtraction and trigonometric manipulation. This is based on the trigonometric identity that:

$$\text{Sin}(A) * \text{Cos}(B) = (\text{Sin}(A+B) + \text{Sin}(A-B))/2 \quad (2)$$

Based on the above identity, this invention eliminates the need for multipliers, which are the difficult-to-implement and bandwidth limiting elements in prior art digital synthesizers.

The embodiment in FIG. 5 can generate waveforms Y(t) in different modes, such as $$U(t) * \text{Sin}(\omega t + \phi(t));$$

or $U(t) + V(t)$;

or $U(t) * V(t)$;

where $U(t)$, $V(t)$, $\omega t$ and $\phi(t)$ are different types of temporal inputs as will be described below.

As an example, if an operator wants to have a carrier frequency with both amplitude and phase modulation such as:

$$U(t) * \text{Sin}(\omega t + \phi(t))$$

then, the IPI in FIG. 5 will be a constant ($\omega * \Delta t$), with the clock cycle being $\Delta t$ and carrier frequency in radians per second being the radian-frequency $\omega$. Note that the radian-frequency $\omega$ may have an FM element in it. The output of the phase accumulator 100 will be a modulo $2\pi$ linearly increasing value in phase as a function of time. The slope of the linear function is the radian-frequency $\omega$, the carrier frequency in radians per second. The term $\phi(t)$ is the phase modulation waveform either externally applied through the second external input 103 or read from the pre-stored values in the second waveform RAM 120, as chosen by the second input-selection MUX 130. The second component-selection MUX 150 selects the phase modulation waveform $\phi(t)$ as its output. Then the input-adder 210 adds up the phase of the carrier frequency $\omega t$ to the phase of the modulation waveform $\phi(t)$.

Another component of the desired waveform is the amplitude modulation waveform U(t). It is either externally determined from the first external input 13 or read from the first waveform RAM 20, as singled out by the first input-selection MUX 30. The first component-selection MUX 50 picks the transformed U(t), in this case $\text{Cos}^{-1}(U(t))$, as its output.

At this point of the present example, all three components of the desired waveform have been massaged to their appropriate forms. The first adder/subtractor 60 adds the output of the first component-selection MUX 50, the transformed amplitude modulated component, to the output B of the input-adder 210, the phase of the instantaneous frequency, to generate the result $(\omega t + \phi(t)) + \text{Cos}^{-1}(U(t))$ for the present example. In the mean time, the second adder/subtractor 160 subtracts the output of the first component-selection MUX 50 from the output B of the input-adder 210 to produce the result $(\omega t + \phi(t)) - \text{Cos}^{-1}(U(t))$.

Next, both the outputs of the first and second adder/subtractor 60, 160 are trigonometrically transformed through the operation of sine, and the output-adder 90 adds their outputs together to generate the desired output waveform as follows:

$$\text{Sin}((\omega t + \phi(t) + \text{Cos}^{-1}(U(t))) + \text{Sin}((\omega t + \phi(t) - \text{Cos}^{-1}(U(t))) \quad (3)$$

Equation 3 is of the same format as the right hand side of Equation 2 and therefore is equal to:

$$2 * \text{Sin}(\omega t + \phi(t)) * \text{Cos}(\text{Cos}^{-1}(U(t)))$$

which can be simplified to:

$$2 * U(t) * \text{Sin}(\omega t + \phi(t)).$$

FIGS. 7a to 7h illustrate output waveforms in applying the above-described invention to a specific example. In this example, $$U(t) = \cos(2\pi * f * t),$$

$$\phi(t) = 0,$$

$\omega = 2\pi \cdot 10 \cdot f.$ and the desired output $Y(t) = U(t) * \sin(\omega t)$. Hence, this invention has generated a carrier frequency having both phase and amplitude modulation with addition, subtraction and trigonometrical manipulation only and without resorting to any physical multiplication.

If an operator wants to sum two waveforms U(t), V(t) using the embodiment shown in FIG. 5, then the output of the phase accumulator 100 should be nulled with the reset 190. The two waveforms U(t) and V(t) are fed in either externally through the first and second external inputs 13, 103 or are read from the waveform RAMs 20, 120, as selected by the first and second input-selection MUXs 30, 130 respectively. Without any trigonometric transformation, the waveforms U(t) and V(t) riding through the component-selection MUXs 50, 150 are added by both the first and second adder/subtractors 60, 160. Finally, the output-adder 90 combines the outputs of the first and the second output-selection MUXs 80, 180 to get the desired waveform 2 * (U(t)+V(t)).

If an operator wants the product of two waveforms, namely, U(t) * V(t), from the design shown in FIG. 5, then again the output of the phase accumulator 100 should be nulled with the reset 190. The two waveforms U(t) and V(t) are fed in either as the first and the second external inputs 13, 103 or read from the waveform RAMs 20, 120, as singled out by the input-selection MUXs 30, 130, respectively. Both the first and the second component-selection MUXs 150, 50 choose the trigonometrically transformed inputs, $\sin^{-1}(V(t))$ and $\cos^{-1}(U(t))$, respectively for the first and the second adder/subtractors 60, 160. The output of the first adder/subtractor 60 is $\sin^{-1}(V(t)) + \cos^{-1}(U(t))$, and the second adder/subtractor 160 performs subtraction on its input waveforms to generate the output $\sin^{-1}(V(t)) - \cos^{-1}(U(t))$. The outputs of both the first and the second adder/subtractors 60, 160 are then trigonometrically transformed through the operation of sine and propagate separately through the first and the second output-selection MUXs 80, 180. In the final process, the output-adder 90 sums the outputs from the output-selection MUXs 80, 180 to generate the following result:

$$\sin(\sin^{-1}(V(t)) + \cos^{-1}(U(t))) + \sin(\sin^{-1}(V(t)) - \cos^{-1}(U(t))).$$

Again, this equation is of the same format as the right hand side of Equation 2 and therefore is equal to:

$$2 \cdot \sin(\sin^{-1}(V(t))) \cdot \cos(\cos^{-1}(U(t)))$$

which can be simplified to $2 \cdot V(t) \cdot U(t)$.

FIGS. 8a to 8g depict output waveforms in applying the invention to a specific example, that is, multiplying an exponentially decaying function with a sinusoidal function.

Finally if an operator puts in a latch after every component in an alternate preferred embodiment of the invention, then the speed of each operation will be limited by the speed of the clock rate or the speed of the slowest operation, whichever is slower.

This invention, as shown, achieves multiplication of waveforms through addition, subtraction and trigonometrical manipulation without resorting to any physical multiplication. The description illustrates multiplication of two waveforms, but the principle of the present invention is easily applicable to extend to multiplication of more than two waveforms by applying embodiments of the invention to parallel and tandem operations.

I claim:

1. A waveform synthesizer, generating a select output waveform, through simulating the multiplication of the components of the select output waveform, comprising:

a first means for producing a first preliminary waveform;

a second means for producing a second preliminary waveform;

a first adder/subtractor receiving the first and second preliminary waveforms for producing a first intermediate waveform;

a second adder/subtractor receiving the first and second preliminary waveforms for producing a second intermediate waveform; and a third means receiving the first and second intermediate waveforms for trigonometrically transforming the first and second intermediate waveform and selectively adding the first and second intermediate waveforms and the trigonometrically-transformed first and second intermediate waveforms to produce the select output waveform.

2. The synthesizer as in claim 1, wherein the first means comprises:

a first waveform storage and retrieval means for producing a first retrieved waveform;

a first multiplexer means receiving the first retrieved waveform and a first external input waveform for selecting one of the first retrieved waveform and the first external input waveform to be the output of the first multiplexer means;

a first trigonometric transforming means connected to the first multiplexer means for trigonometrically transforming the output of the first multiplexer means to produce the output of the first trigonometric transforming means; and a second multiplexer means connected to the first trigonometric tranforming means and the first multiplexer means for selecting one of the output of the first multiplexer means and the output of the first trigonometric transforming means to produce the first preliminary waveform.

3. The synthesizer as in claim 2, wherein the first waveform storage and retrieval means comprises:

a first memory address sequencer receiving a first input waveform; and a first waveform memory means connected to the first memory address sequencer for producing the first retrieved waveform in response to the first input waveform.

4. The synthesizer as in claim 1, wherein the second means comprises:

a second waveform storage and retrieval means for producing a second retrieved waveform;

a third multiplexer means connected to the second waveform storage and retrieval means and receiving a second external input waveform for selecting one of the second retrieved waveform and the second external input waveform to be the output of the third multiplexer means;

a second trigonometric transforming means connected to the third multiplexer means for trigonometrically transforming the output of the third multiplexer means to produce the output of the second trigonometric transforming means;

a fourth multiplexer means connected to the second trigonometric transforming means and the third multiplexer means for selecting one of the output of the second trigonometric transforming means and the output of the third multiplexer means to produce the output of the fourth multiplexer means;

a phase accumulating means receiving an instantaneous phase increment; and a first adder connected to both the fourth multiplexer means and the phase accumulating means for producing the second preliminary waveform.

5. The synthesizer as in claim 4, wherein the second waveform storage and retrieval means comprises:
a second memory address sequencer receiving a second input waveform; and
a second waveform memory means connected to the second memory address sequencer for producing the second retrieved waveform in response to the second input waveform.

6. The synthesizer in claim 1, wherein the third means comprises:
a third trigonometric transforming means connected to the first adder/subtractor for trigonometrically transforming the output of the first adder/subtractor to produce the output of the third trigonometric transforming means;
a fifth multiplexer means connected to both the third trigonometric transforming means and the first adder/subtractor for selecting one of the output of the third trigonometric transforming means and the output of the first adder/subtractor to produce the output of the fifth multiplexer means;
a fourth trigonometric transforming means connected to the second adder/subtractor for trigonometrically transforming the output of the second adder/subtractor to produce the output of the fourth trigonometric transforming means;
a sixth multiplexer means connected to both the fourth trigonometric transforming means and the second adder/subtractor for selecting one of the outputs of the fourth trigonometric transforming means and the second adder/subtractor to produce the output of the sixth multiplexer means; and
a second adder connected to both the fifth multiplexer means and the sixth multiplexer means for producing the select output waveform.

7. The synthesizer as in claim 1, wherein:
the first preliminary waveform is the Arc Cosine of an amplitude modulation waveform;
the second preliminary waveform is the sum of the phase of a carrier frequency and a phase modulation waveform;
the first intermediate waveform is the sum of the first preliminary waveform and the second preliminary waveform;
the second intermediate waveform is the first preliminary waveform subtracted from the second preliminary waveform; and
the third means performs the trigonometric operation of sine onto the first and the second intermediate waveforms and adds the trigonometrically transformed waveforms together to produce the select output waveform.

8. The synthesizer as in claim 1, wherein:
the first preliminary waveform is the arc cosine of a first component;
the second preliminary waveform is the arc sine of a second component;
the first intermediate waveform is the sum of the first and the second preliminary waveforms;
the second intermediate waveform is the first preliminary waveform subtracted from the second preliminary waveform; and
the third means performs the trigonometric operation of sine onto the first and the second intermediate waveforms and adds the trigonometrically transformed waveforms together to generate twice the product of the first and the second components to produce the select output waveform.

9. A method of synthesizing a select output waveform, through simulating the multiplication of the components of the select output waveform, comprising the steps of:
generating a first preliminary waveform;
generating a second preliminary waveform;
selectively adding and subtracting the first and the second preliminary waveforms to generate a third preliminary waveform;
selectively adding and subtracting the first and second preliminary waveforms to generate a fourth preliminary waveform;
trigonometrically transforming the third and fourth preliminary waveforms to generate their trigonometrically-transformed counterparts; and
selectively adding the third and fourth preliminary waveforms and their trigonometrically-transformed counterparts to produce the select output waveform.

10. The method of claim 9 wherein the step of generating a first preliminary waveform comprises the steps of:
pre-storing a first waveform;
retrieving the first pre-stored waveform;
feeding in a first external input waveform;
selecting one of the first pre-stored waveform and the first external input waveform to be a first intermediate waveform;
trigonometrically transforming the first intermediate waveform; and
selecting one of the first intermediate waveform and the trigonometrically-transformed first intermediate waveform to produce the first preliminary waveform.

11. The method of claim 9 wherein the step of generating a second preliminary waveform comprises the steps of:
pre-storing a second waveform;
retrieving the second pre-stored waveform;
feeding in a second external input waveform;
selecting one of the second pre-stored waveform and the second external input waveform to be a second intermediate waveform;
trigonometrically transforming the second intermediate waveform;
Selecting one of the second intermediate waveform and the trigonometrically-transformed second intermediate waveform to produce a third intermediate waveform;
generating a phase waveform by accumulating an instantaneous phase increment; and
adding the phase waveform to the third intermediate waveform for producing the second preliminary waveform.

12. The method in claim 9 wherein the step to produce the select output waveform comprises the steps of:

selecting one of the third preliminary waveform and the trigonometrically-transformed third preliminary waveform to produce a fourth intermediate waveform;

selecting one of the fourth preliminary waveform and the trigonometrically-transformed forth preliminary waveform to produce a fifth intermediate waveform; and adding the fourth intermediate waveform to the fifth intermediate waveform to produce the select output waveform.

* * * * *